United States Patent
Kosem

[15] 3,668,500
[45] June 6, 1972

[54] NUMERICAL SERVO MOTOR CONTROL SYSTEM

[72] Inventor: Marion Kosem, Willoughby, Ohio
[73] Assignee: Allen-Bradley Company, Milwaukee, Wis.
[22] Filed: Apr. 1, 1970
[21] Appl. No.: 29,365

Related U.S. Application Data

[63] Continuation of Ser. No. 654,887, July 20, 1967, abandoned.

[52] U.S. Cl..............................318/601, 318/603, 318/594
[51] Int. Cl. .......................................................G05b 19/28
[58] Field of Search.................318/601, 603, 604, 608, 594

[56] References Cited

UNITED STATES PATENTS

| | | | |
|---|---|---|---|
| 2,928,033 | 3/1960 | Abbott | 318/604 |
| 2,970,302 | 1/1961 | Gridley | 318/608 X |
| 2,983,872 | 5/1961 | Williamson et al. | 318/604 X |
| 3,258,667 | 6/1966 | McDonough et al. | 318/603 |
| 3,374,359 | 3/1968 | Anderson | 318/603 X |
| 3,439,336 | 4/1969 | Toifl et al | 318/603 X |
| 3,466,517 | 9/1969 | Leenhouts | 318/603 |
| 2,775,727 | 12/1956 | Kernahan et al | 318/601 |

OTHER PUBLICATIONS

Follingstad, " An Optical Position Encoder and Digit Register," Proceedings of the IRE, Nov. 1952, Vol. 40, No. 11, pp. 1,573– 1,583

Primary Examiner—T. E. Lynch
Attorney—Arnold J. Ericsen and Richard C. Steinmetz, Jr.

[57] ABSTRACT

The motion of a machine tool table is controlled by comparing, for each axis, present location of the machine tool which is represented by the count in a feedback counter, with a desired location, which is represented by the count in a command counter. A transducer produces a pulse train wherein each pulse is representative of increments of machine tool table motion. A reference source of oscillation feeds pulses to drive the command counter. These pulses are modulated by the pulses from the feedback transducer and then are applied to drive the feedback counter. The difference in time at which both counters attain predetermined counts is sensed and is used to generate signals which control the application of drive signals to the motors which drive the machine tool tables.

17 Claims, 11 Drawing Figures

NUMERICAL SERVO MOTOR CONTROL SYSTEM

This application is a continuation of application Ser. No. 654,887, filed July 20, 1967.

BACKGROUND OF THE INVENTION

1. Field of the Invention

This invention relates to numerical machine tool control devices and more particularly to improvements therein.

An object of this invention is the provision of a novel and useful numerical control system for machine tools;

Yet another object of the present invention is the provision of a unique numerically controlled absolute positioning system for machine tools;

Yet another object of the present invention is the provision of a numerical control system which continuously compares the commanded and actual tool positions for the purpose of generating signals for commanding the motion of the machine tool until the two are made identical.

2. Summary of the Invention

This invention provides a novel numerical control system for a machine tool wherein for each axis there is provided a position command counter and a feedback counter. Data indicative of the end point desired for the machine tool table, along each axis, is entered into the respective position command counters. If the machine tool table is at the outset on the 0,0,0 axis position then the feedback counters will each have a 0 count, otherwise, each one of them contains a count representative of the present location of the machine tool table along the respective axes.

A common oscillator then drives each one of the command counters with its output. A comparator for each axis, compares the count in the position command counter with that of the feedback counter and generates an error signal which is employed to instruct the machine tool table to move. A pulse generator connected to the drive shaft of the motor driving the machine tool table generates pulses which in accordance with the sign of the motion are added to or subtracted from the oscillator signals which are then used for driving the feedback counter. As a result, the count in the feedback counter will eventually catch up to the count in the position command counter and when they are both identical the operation is stopped, since that is indicative of the fact that the machine tool table has reached the commanded position.

DESCRIPTION OF THE PREFERRED EMBODIMENT

This invention is directed to apparatus which receives commands, which are stored in the form of encoded numbers recorded on any suitable medium, such as punched paper tape, and which converts these commands into the proper signals for controlling the operation of a machine tool which carries out these commands. Since the apparatus for reading the stored command information from the storage, such as punched paper tape, converting that information into a suitably representative signal pattern, and transferring that signal pattern into a register or a counter, together with all the other associated functions used with numerically controlled machine tools, may be the same for this apparatus as they are for others, the details of these will not be described.

Figure 1:
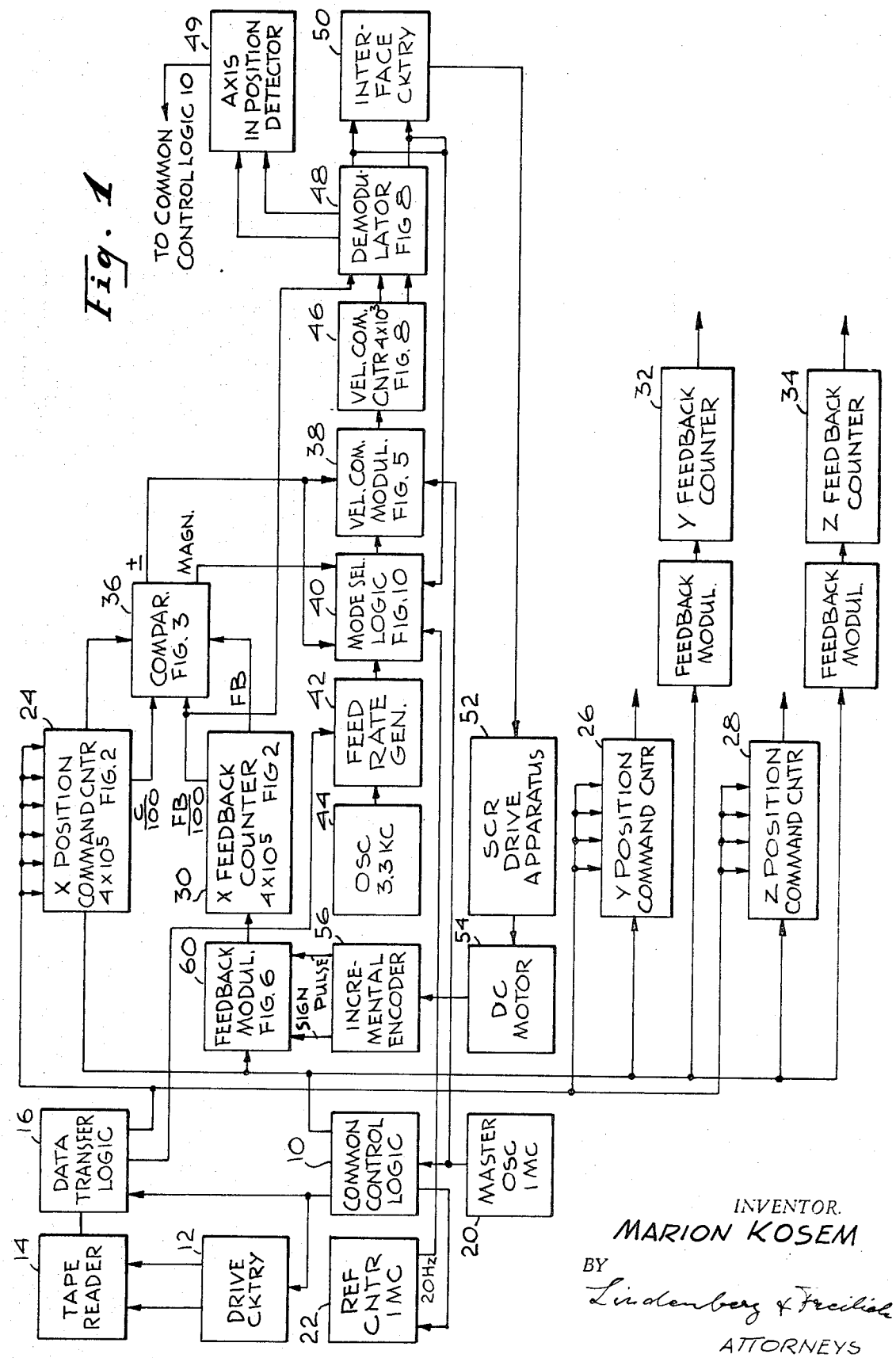
FIG. 1 is a block schematic diagram of an embodiment of the invention.

FIG. 1 is a block schematic diagram of an embodiment of the invention. A rectangle labeled common control logic 10, performs the function of enabling tape reader drive circuitry 12 to advance tape on which numerical control data is recorded whereby a tape reader 14 can provide a pattern of output signals which represents instructions or commands to a numerically controlled machine tool system. These are the usual instructions as to which tool is to be used, the feed rate instructions, lubricant instructions, and instructions indicative of the end point location to which it is desired to move the machine tool table from the present location. The latter instructions are the ones with which this invention is concerned. The instructions, which are usually converted to a pattern of electrical signals, are entered into circuitry designated as tape data transfer logic 16. This constitutes an arrangement of gates and registers which under the control of the common control logic 10 stores some of this data for use during and after the machine tool motion, and also transfers some of this data into other equipment which immediately commences operation in response thereto.

As thus far described, the structures are those of the prior art and are presently in use in numerical control apparatus which is commercially available. In accordance with this invention, there is provided a master oscillator 20 which, by way of example, produces oscillations at a 1 megacycle frequency. There is also provided a reference counter 22 which serves the function of being an absolute reference for the system. Its output may be used for indicating the time for the occurrence of operations other than that of moving the machine tool table. It also provides a signal having a 20 Hz frequency which, as will be described subsequently, is used if required for driving the machine tool a last predetermined increment of distance to the desired end point.

GENERAL DESCRIPTION OF OPERATION

At the outset, there is entered into the respective axis position command counters 24, 26, 28, a number representing the end location desired for the machine tool table. The feedback counter 30, 32, 34, for each axis provides the present or instantaneous location of the machine tool table, and the table is commanded to move until the location number in the position command counter and the table position number in the feedback counter for each axis is the same. Thus, at the outset, in response to the data in the tape data transfer logic circuitry 16, each one of the position command counters respectively 24, 26, and 28 is forced into a count condition representative of the end location desired for the table. At that time, the feedback counter will contain the present location of the table. It should be appreciated that this starting position need not be 0,0,0.

The length of these counters is dependent on the maximum dimension and desired positioning accuracy. For example, for a 100 inch system and a 0.0005 inch resolution, a counter having a $4 \times 10^5$ count length is required. Assuming a 1 megacycle input rate into the counters, a 5 cycle per second sampling rate results. Since this sampling rate is too low to be used directly by the servoelectronics, which are usually associated with moving a machine tool table, an effective error signal of a much higher sampling rate must be generated.

The apparatus, which will henceforth be described, is duplicated for each axis.

A comparator 36 is used to compare the phase of the outputs from the position command counter 24 and the feedback counter 30. It should be appreciated that each axis requires its own comparator. The comparator makes a comparison of the last count output from the position command counter (C) and the last count output of the feedback counter (FB). The logical "not" form of these counts ($\overline{C}$ and $\overline{FB}$) is also provided. Also applied to the comparator from the respective position command counter and the feedback counter are the outputs of these counters which occur at respective counts C/100 and FB/100 and their logical "not" form $\overline{C}/100$ and $\overline{FB}/100$. Accordingly, assuming the counter is $4 \times 10^5$ counts in length, and is being driven by a 1 megacycle per second signal, the C signal will occur at 2.5 cycles per second and the C/100 signal will occur at 250 cycles per second. The time of occurrence of the FB and the FB/100 outputs is determined by how fast the machine tool table is moving as well as the direction of its motion. This will become more clear as this explanation progresses.

The comparator 36, which is composed of a coarse and a fine demodulator, makes a decision on every sample of the coarse demodulator (5 samples per second). If the distance to the desired end point for the machine tool table is indicated in the comparator as being greater than 1 inch (taken for illustrative purposes and not as a limitation on the invention), a constant level signal results. When the distance to the end point has been diminished to less than 1 inch, then the fine demodulator output (500 samples per second) of the comparator supplies a signal proportional to the actual error between the command and feedback counters. If overshoot occurs, an error signal of opposite polarity is generated to return this system to its commanded position. That output of the comparator which consists of sign information is applied to a velocity command modulator 38. Both sign and error signal magnitude information are supplied to a mode select logic arrangement 40.

A feed rate generator 42 has feed rate data entered therein from the tape data transfer logic 16 at the same time that position command data is entered into the position command counter 24. The feed rate generator 42 is driven in response to the output of a feed rate oscillator 44. The feed rate generator 40 provides an output to the mode select logic 40 consisting of a pulse train occurring at a rate which is determined by the feed rate data word entered therein from the data transfer logic 16. Feed rate generator structure is well-known in the numerical machine tool control field and appears in commercially sold machines. A suitable feed rate generator may be found described in detail and shown in U.S. Pat. to P. H. McGarrell, No. 3,079,522. However, any of the well-known arrangements for producing a pulse train at a rate specified by a feed rate number may be employed here.

The mode select logic circuitry 40, determines the source of pulses which are to be supplied to the velocity control loop for the machine tool table. These are applied through the velocity command modulator 38 to a velocity command counter 46, whose output is applied to a demodulator 48, whose output in turn is applied to the usual interface circuitry 50, normally comprising a digital-to-analog circuit which converts pulse width signals to analog drive signals. The output of the interface circuitry is applied to a silicon control rectifier drive system 52, whose output is used to drive a DC motor 54 attached to the machine tool table (not shown). An incremental encoder 56 in response to the rotation of the shaft of the motor generates a pulse for every increment of motion and also a sign signal indicative of the direction or sign of the motion. The pulse train and sign information are supplied to a feedback modulator 60. The purpose of the feedback modulator is to add or subtract the pulses received from the incremental encoder 56 to or from the one megacycle oscillations received from the master oscillator 20 through the common control logic 10, depending on the direction of rotation of the shaft of the motor and thus the direction of motion of the machine tool table, as indicated by the sign signal. Thus, 1 megacycle pulses, plus or minus the pulses received from the incremental encoder, are applied by the feedback modulator 60 to drive the feedback counter 30 until it is in phase with the position command counter 24, as detected by the comparator 36.

In order to better explain the function of the mode select logic 40 an example will be postulated. Assume that the distance to the desired end point for the machine tool table is greater than one inch. The sign signal output of the comparator determines the sign of the input to the velocity command modulator 38. Since the actual distance to the end point is now greater than the "following error," represented by the demodulator 48 output, pulses from the feed rate generator are passed to the velocity command modulator. The following error is an indication of the distance the machine tool is behind the command pulse train. Following error, which is created at the demodulator 48, output is also used in determining the source of the driving signals whether feed rate or 20 Hz to the circuitry which follows.

As the tool proceeds toward the end point, a point is reached when the distance to the end point is less than or equal to the following error. When this condition is detected, the feed rate generator output is blocked and the machine tool table then moves both in response to inertia and to the 20 Hz pulse train provided by the reference counter. A constant deceleration is produced and the following error begins to get smaller. At this time error integration is begun. This assures the fact that the tool will reach the commanded position.

The velocity at which the machine tool is first commanded to move is originally determined from the feed rate number stored on the tape. This determines the frequency of the pulses received from the feed rate generator. In the feed rate mode of operation (the distance to the end point is greater than the following error), the feed rate pulses modulated on the 1 megacycle pulse create a phase shift in the velocity command counter. This counter has a count capacity corresponding to 1 inch. The output from this counter is compared by the demodulator 48 with a corresponding point in the feedback counter (FB/100), whereby a following error is created in the output of the demodulator 48. This following error, which is a digital signal, is then converted to a bi-polar analog voltage by the interface circuitry 50. This bi-polar analog voltage is then converted by the usual silicon control rectifier apparatus 52 to a motor drive signal.

The increment encoder 56 can include a disc having an inner and an outer circular track adjacent to each other and placed near the outer periphery. Each track may contain alternating black and white indicia or spaced holes. Also, the indicia in the inner track alternates with the indicia on the outer track. Photoelectric apparatus placed opposite each track is used to generate two pulse trains, say A and B, which for one direction of disc rotation has pulses of train A leading pulses of train B and vice versa for reverse rotation of the disc. Well-known logic converts these pulse trains into sign and pulse train signals as indicated. Devices of this sort are well-known and are commercially purchasable. They are known as "incremental encoders" and are sold, for example, by the Trump-Ross Corporation of Boston, Massachusetts, or by the Dynamics Research Corporation of Stoneham, Massachusetts. Thus, the incremental encoder converts the analog position information into pulse train and sign form. The quantized shaft rotation is then used to generate the absolute actual position of the machine table at any time.

Reviewing briefly now the operation of the system, at the outset a number representing the end point location is introduced into the position command counter 24 which is set to that number. Feed rate data is also introduced into the feed rate generator. The output from the master oscillator is then permitted to be applied to the reference counter 22, the position command counter 24, to the feedback modulator 60, and also to the velocity command modulator 38. The feedback counter contains at the outset, the present location of the machine tool table, while the position command counter contains, at the outset the desired end location of the machine tool table. The comparator 36 compares the relative phase relationship of the position command counter and feedback counter and produces one output signal indicative of the fact that the distance to the end point is greater than a predetermined amount, (for example, 1 inch) or a second signal (a series of pulses) indicative that the distance to the end point is less than 1 inch. The comparator also provides a signal indicative of the sign.

The feed rate generator produces pulses which, as long as the comparator output signal indicates that the distance to the end point exceeds the predetermined amount, are modulated on the output of the master oscillator and can then drive a velocity command counter. The velocity command counter is a cyclic counter having the count capacity representative of the predetermined amount (here 1 inch or $4 \times 10^3$). The output of this counter is compared in phase with the output of the feedback counter at the same count position ($4 \times 10^3$). The comparison is made by a demodulator 48. The output of the demodulator is then converted by the interface circuitry 50 to control signals for driving the motor which moves the machine tool table.

Incremental encoder apparatus 56 coupled to the motor generates a sign signal and a pulse train. The feedback modulator 60 adds the pulse train to or subtracts it from the 1 megacycle signals being applied to drive the feedback counter 30.

As the machine tool table reaches a position which is less than the predetermined distance from the desired end position, mode select logic circuitry 40 blocks further pulses from the feed rate generator 42 from being applied to the velocity command counter. At this time error integration is determined by the 20 Hz signals from the reference counter 22.

When the count in the feedback counter, and that in the position command counter are identical for each axis, the machine tool table has reached the designated position. At this time a signal is applied to the common control logic 10. The other instructions for the machine tool which are to be carried out when the machine tool table reaches a designated position may then be carried out. Thereafter, the tape reader and other circuits are energized to inject new counts into the respective position command counters and into the feed rate generator.

Figure 8:
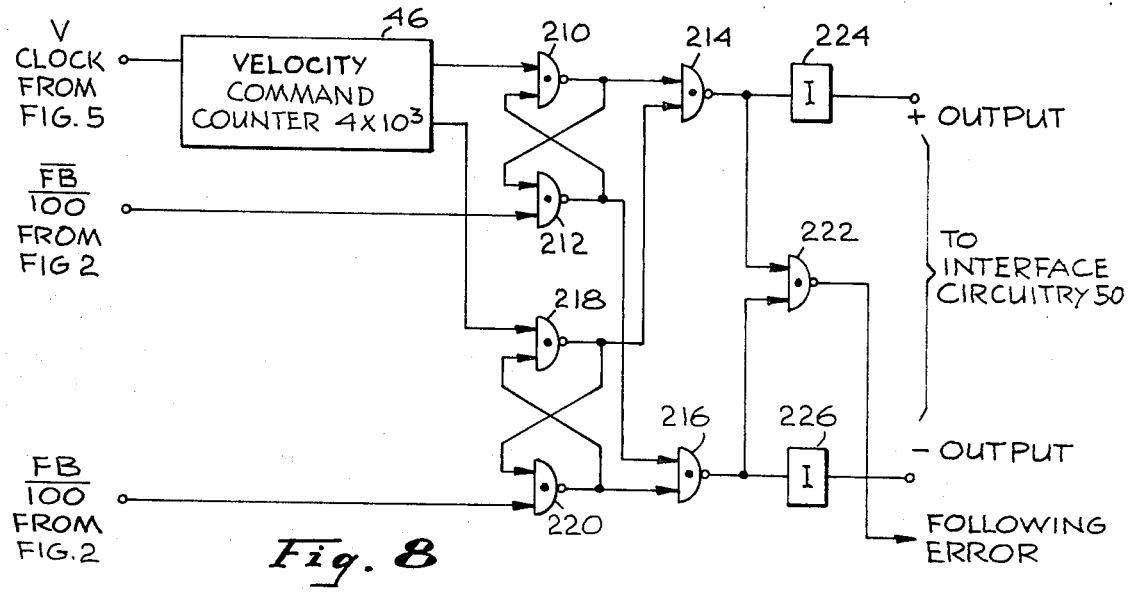
FIG. 8 is a block schematic diagram of the velocity counter and demodulator circuits which are employed at each axis in accordance with this invention.

The circuitry for detecting when each axis is in position is shown with the demodulator circuitry in FIG. 8, and is described at that time. Each "axis in position signal" is applied to an axis in position detector 49, which can be a suitable AND gate, and its output is applied to the common control logic 10 to initiate the next operation of the system.

POSITION COMMAND COUNTER, FEEDBACK COUNTER

Figure 2:
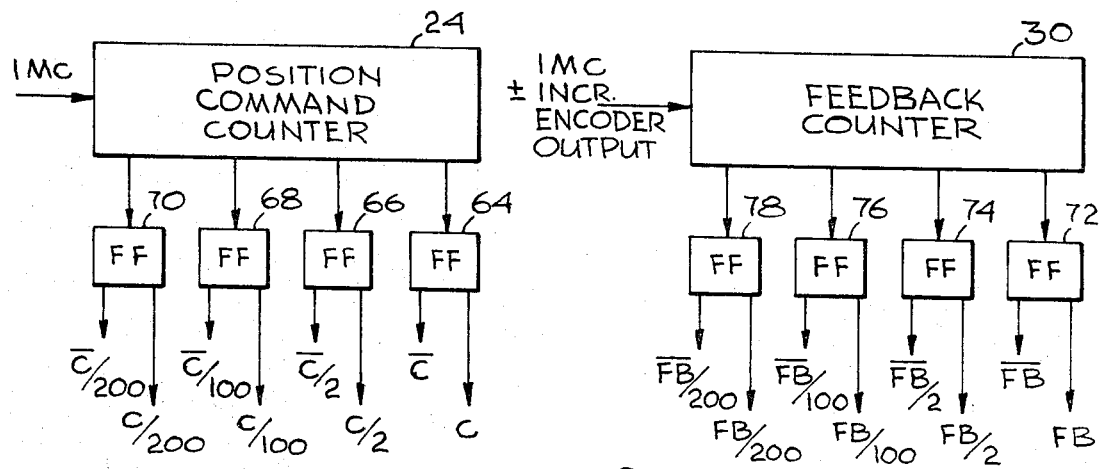
FIG. 2 is a block diagram of the position command counter and feedback counter and their outputs.

FIG. 2 is a block schematic diagram illustrating the position command counter 24 and its outputs, the feedback counter 30 and its outputs. Any of the well-known cyclic counters are suitable for use as a position command counter 24 and as a feedback counter 30. The count capacities for each counter is determined by the desired length of travel and the number of indivisible increments desired (pulses), to command that desired length of travel. For the example assumed, $4 \times 10^5$ count outputs are taken from both counters when they reach their maximum count states which are respectively designated as C and FB, $2 \times 10^5$ count outputs are taken at their half-full count states, respectively designated as C/2 and FB/2, the count state representative of 1 inch of travel respectively designated for each counter as C/100 and FB/100, ($4 \times 10^3$), and the half-inch count for each counter respectively designated as C/200 and FB/200 ($2 \times 10^3$).

In order to generate the logical "not" signal whenever the indicated counts are not present, each one of the count outputs is used to drive a flip-flop to its set state, which is reset when the count terminates. Thus, flip-flop 64 provides a C output signal in its set state and a $\overline{C}$ signal in its reset state. Flip-flop 66 provides the respective C/2 and $\overline{C}/2$ outputs for its respective set and reset states. Flip-flop 68 provides the respective C/100 and $\overline{C}/100$ for its respective set and reset states. Flip-flop 70 provides the C/200 and $\overline{C}/200$ for its respective set and reset states. Flip-flop 72 provides the FB and $\overline{FB}$ signals for its respective set and reset states. Flip-flop 74 provides FB/2 and $\overline{FB}/2$ for its respective set and reset states. Flip-flop 76 provides the FB/100 and $\overline{FB}/100$ output for its respective set and reset states. Flip-flop 78 provides the FB/200 and $\overline{FB}/200$ for its respective set and reset states.

It should be noted that, in operation, in the course of counting to the full count, both occurs will produce the lower order outputs as many times as indicated by the full count division. Thus, in the case of the position command counter, C is the full count. There will be 100 C/100 signals produced for each C signal, also two C/2 signals produced for each C signal. Similarly, in the case of the feedback counter, F is the full count and in attaining this, 100 FB/100 signals are emitted, and 200 FB/200 signals, etc. This is a normal counter operation but is emphasized here to assist in an understanding of the operation of the system. This is why, for example, it is possible to generate the following error from a comparison of the velocity command counter 46, which emits an output each time it has received a number of command pulse inputs equivalent to 1 inch, with the FB/100 or 1 inch output of the feedback counter, which occurs, only after the machine tool has moved one inch from its last 1 inch count position.

COMPARATOR CIRCUIT—FIG. 3

The comparator circuit 36 (shown in FIG. 1) operates on the phase demodulated error signals derived from the command counter and in the feedback counters. The coarse demodulator receives C and FB signals and then produces an error signal proportional to the distance to each end point. This error signal is, however, at such a low sampling rate (5 samples per second) that it cannot be used directly. It is, however, used in conjunction with a fine phase demodulator which has a higher sampling rate.

The coarse demodulator can resolve distances of up to 99.9995 inches at a 5 cycle per second sampling rate. The fine demodulator receives its inputs from the 1 inch point in each counter ([C/100], [FB/100]). The corresponding sampling rate of 500 cycles per second can therefore resolve distances up to an inch. The comparator, made up of the coarse and fine demodulators, produces a constant DC output for errors greater than 1 inch, and provides a phase modulated signal proportional to the distance to end point (DTETP) within 1 inch.

The coarse demodulator takes a sample at every C time and terminates this sample at FB time. The fine demodulator generates 1 inch reference signals at C/2 time and takes a sample at every C/100 time, which is terminated at FB/100 time.

Figure 3:
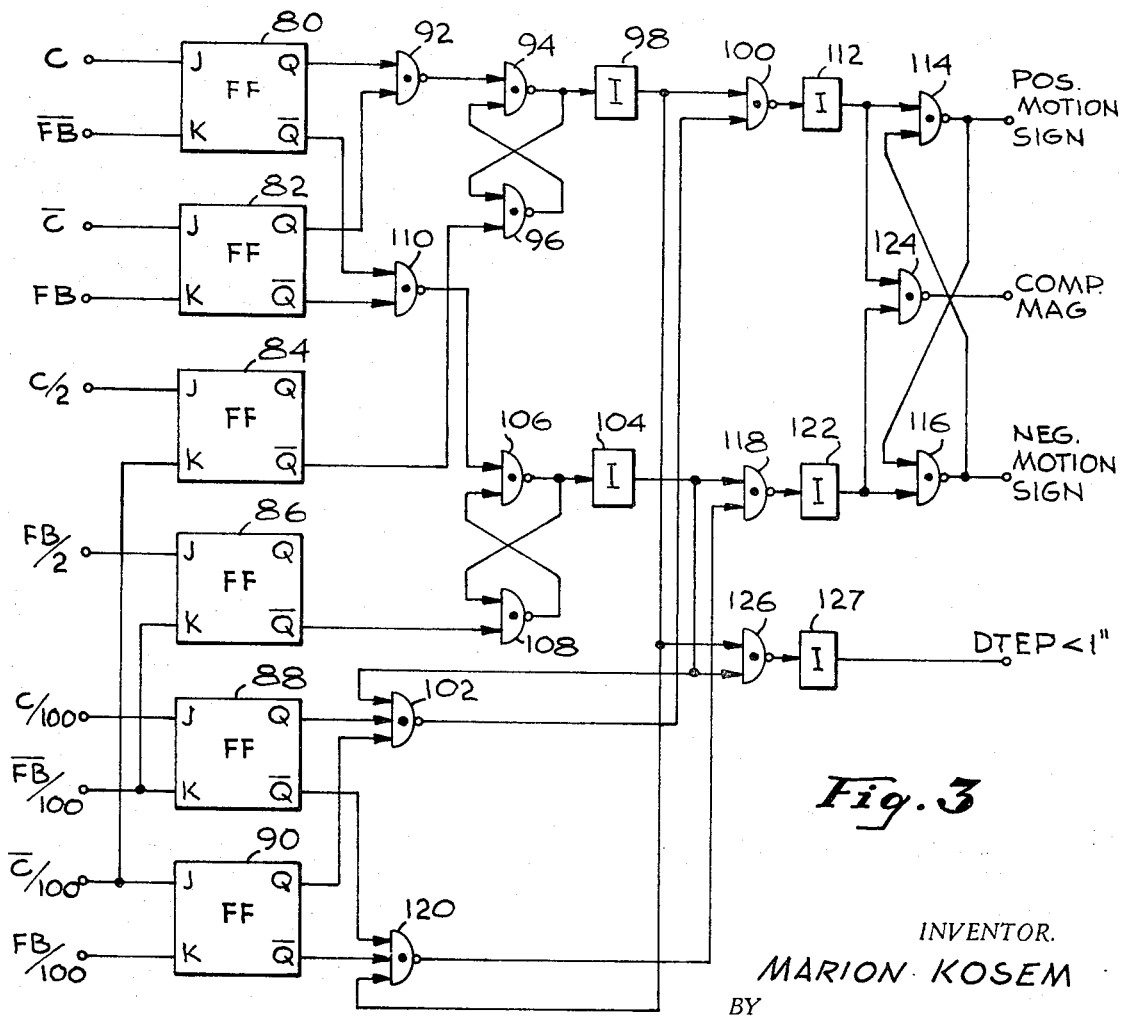
FIG. 3 is a block schematic diagram of a comparator which is employed in this invention.

As shown in FIG. 3, the outputs from the command and feedback counters are applied to the respective flip-flops, 80, 82, 84, 86, 88 and 90. The flip-flop inputs are indicated as J and K, and the corresponding outputs are indicated as Q and $\overline{Q}$. These flip-flops are driven in response to the negative going portion of an applied signal. The Q outputs of flip-flops 80 and 82 are applied to a NAND gate 92. A NAND gate is a well-known logical element which may be comprised of an AND gate followed by an inverter. When one or all inputs are low, the output of the NAND gate is high, and when all of the inputs are high, the output is low.

The output of NAND gate 92 is connected, as one input, to another NAND gate 94, which is flip-flop connected with a NAND gate 96. That is, the output of NAND gate 94, besides being connected to an inverter 98, is connected as one input to a NAND gate 96. The other input to a NAND gate 96 is the $\overline{Q}$ output of flip-flop 84. The output of NAND gate 96 is connected as a second input to NAND gate 94. The output of inverter 98 is one input to a NAND gate 100, whose second input is the output of a NAND gate 102. The other two inputs to NAND gate 102 are the Q outputs of flip-flops 88 and 90. The third input to NAND gate 102 comes from an inverter 104, which is driven by the output of flip-flop connected NAND gates 106 and 108. The second input to NAND gate 108 is a $\overline{Q}$ output of flip-flop 86. The second input to NAND gate 106 is the output of a NAND gate 110 whose two inputs are the $\overline{Q}$ outputs of flip-flops 80 and 82. The flip-flop made up of NAND gates 106, 108, and inverter 104 are used when the sign of the motion commanded for the machine tool table is negative.

The output of NAND gate 100 is applied to an inverter 112 whose output is one input to a NAND gate 114. NAND gate 114 is flip-flop connected with a NAND gate 116. The output of the inverter 104 is one input to a NAND gate 118, whose other input is the output of a NAND gate 120. NAND gate 120 has as two of its required inputs, the $\overline{Q}$ outputs of flip-flops 88 and 90. The third input is the output of inverter 98.

NAND gate 118 output drives an inverter 122 whose output is the second input to the NAND gate 116. The outputs of inverters 112 and 122 are also applied as the two inputs to a NAND gate 124. The output of the NAND gate 124 serves as the comparator magnitude indication, which is high when the distance to the end point is more than 1 inch. The sign of the required motion is the output of the NAND gate 114.

A NAND gate 126 has the outputs of the two inverters 98 and 104 as its inputs. The NAND gate 126 is followed by an inverter 127. Its output, when high, indicates that the distance to the end point is less than 1 inch away.

By way of showing the operation of the comparator, consider initially that the distance to the end point is greater than an inch, and the motion required has a positive sign. When the command counter attains its final count, its output is C. Just before this the $\overline{C}$ output goes negative, whereupon flip-flop 82 is driven to the state when its Q output is high. Upon the termination of the C count, flip-flop 80 is driven to have its Q output high. Accordingly, NAND gate 92 has two high inputs and its output is low. This condition is maintained until both flip-flops are reset, which occurs in the presence of negative going $\overline{FB}$ and FB inputs.

Figure 4:
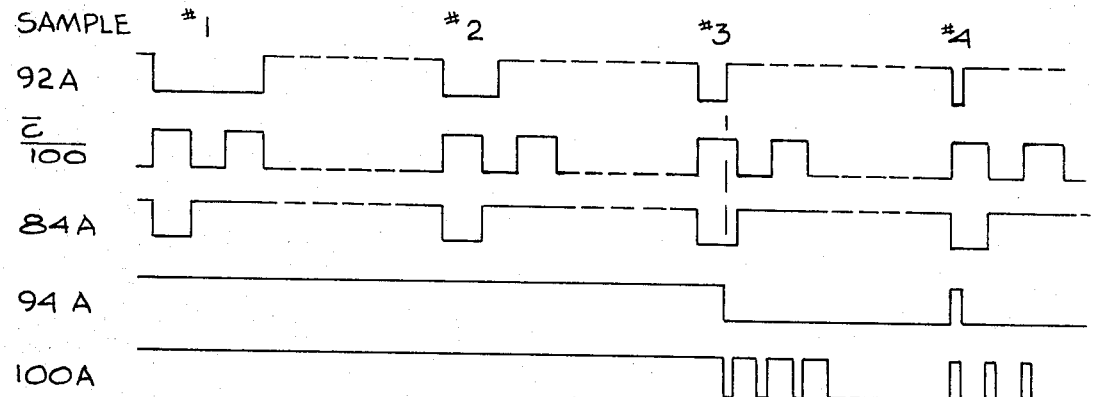
FIG. 4 is a waveshape diagram shown to assist in an understanding of the operation of the comparator.

Reference should also be made to FIG. 4, which represents waveforms obtained at various strategic locations on the circuit of FIG. 3, which will assist in an understanding of its operation. The waveforms are output waveforms and are given the same numerals as the circuits of which they represent the output plus a letter.

The output of NAND gate 92 is the coarse demodulator output, which goes from high to low and remains low until the occurrence of the $\overline{FB}$ and FB signals when it is returned to high again. The duration of this "low" signal output is an analog measurement of the distance the table must move in order to make both counters have the identical count. As shown in FIG. 4, waveshape 92A shows the output from gate 92 for five samples (not taken consecutively) illustrating, when measured against a 1 inch signal, how the low output of gate 92 gets narrower until, at sample 3, the distance to the end point, as indicated by the difference in the counters, is less than 1 inch.

A reference error (1 inch) is generated by the $\overline{Q}$ output of the flip-flop 84 (see waveform 84A). This occurs because the $\overline{Q}$ output occurs at the beginning of each sample by the negative transition of the C/2 signal, and is reset 2 milliseconds later by the negative transition of $\overline{C}$/100 signal. This is represented by waveform 84A. This reference error is then compared to the actual error out of the coarse demodulator by the flip-flop made up of NAND gates 94 and 96. The final state of this flip-flop provides an indication as to which of the two error signals is greater. Waveform 94A indicates the output of the flip-flop as determined by the output of NAND gate 94. It should be noted at this time that the command counter will provide two C/2 outputs for every C output. Thus the comparison of the $\overline{Q}$ output of flip-flop 84 with that of NAND gate 92 is valid, since both outputs go low together.

As long as the comparator detects an error greater than 1 inch, the fine demodulator output derived from NAND gate 120 is blocked, since there is a low input received from inverter 98. The fine demodulator output from NAND gate 102 is applied to NAND gate 100 whose output effectively is that of the comparator for positive sign motion. The output of NAND gate 118 is that of the comparator for negative sign motion. NAND gate 100 provides a high output during the sampling time of the coarse demodulator as long as the coarse demodulator output is greater than 1 inch. (See waveform 100A.)

Inverter 112 applies a low input to NAND gate 114 whose output which also indicates sign, is high. The low input to NAND gate 124 causes it to have a high output. Thus the comparator magnitude at this time is high. NAND gate 126 receives a low input from inverter 98 and a high input from inverter 104. Thus its output is high, but is inverted by the inverter 127 and thus is low. Accordingly, for the assumed greater than 1 inch situation, the comparator magnitude output is high, the comparator sign output is high and the distance to end point signal is low.

NAND gates 110, 106, 108, 118 and inverters 104 and 122 are used for negative motion (FB precedes C). Therefore, during positive motion sample time, the channel including these circuits is blocked. NAND gate 110 has a high output, NAND gate 106 a low output, inverter 104 a high output, NAND gate 118 output is low and inverter 122 output is high.

Now, assuming that the distance to the end point is less than 1 inch, then the $\overline{FB}$ and FB signals from the feedback counter will reset flip-flops 80 and 82 within the duration of the $\overline{Q}$ output signal from the flip-flop 84. This will cause a high input to NAND gate 100 from inverter 98 which will remain high until the end of $\overline{Q}$ when it goes low again. When inverter 98 output goes high, NAND gate 126 output goes low. Inverter 127 then produces a high output.

When the output of inverter 98 goes high, it permits the output of the fine demodulator, as represented by the output of NAND gate 102, to pass through NAND gate 100 and from thence to the comparator magnitude NAND gate 124. This consists of a pulse train, each pulse of which has a duration representing the difference between C/100 and FB/100 counts.

NAND gate 126 now passes a pulse train at each sample time, each pulse of which has a duration representative of the distance of the machine tool to the end point.

The operation of the system described is essentially the same when the machine tool table is commanded to travel in an opposite direction. NAND gate 110 is the negative counterpart of NAND gate 92, NAND gates 106 and 108 are the negative counterparts of NAND gates 94 and 96, NAND gate 118 corresponds negatively to NAND gate 100, and inverter 122 corresponds negatively to inverter 112. The operation of these circuits for negative motion should therefore be clear from the description for their positive motion counterpart.

VELOCITY COMMAND MODULATOR, FIG. 5

The velocity command modulator supplies pulses to the velocity counter. The basic function of the modulator is to modify the carrier frequency as a function of the sign and magnitude of the command input signals. The modulator output frequency is then the algebraic sum of the carrier (1 Mega Hertz) and the input frequency. The controlling sign of the velocity modulator comes from the comparator.

Figure 7:
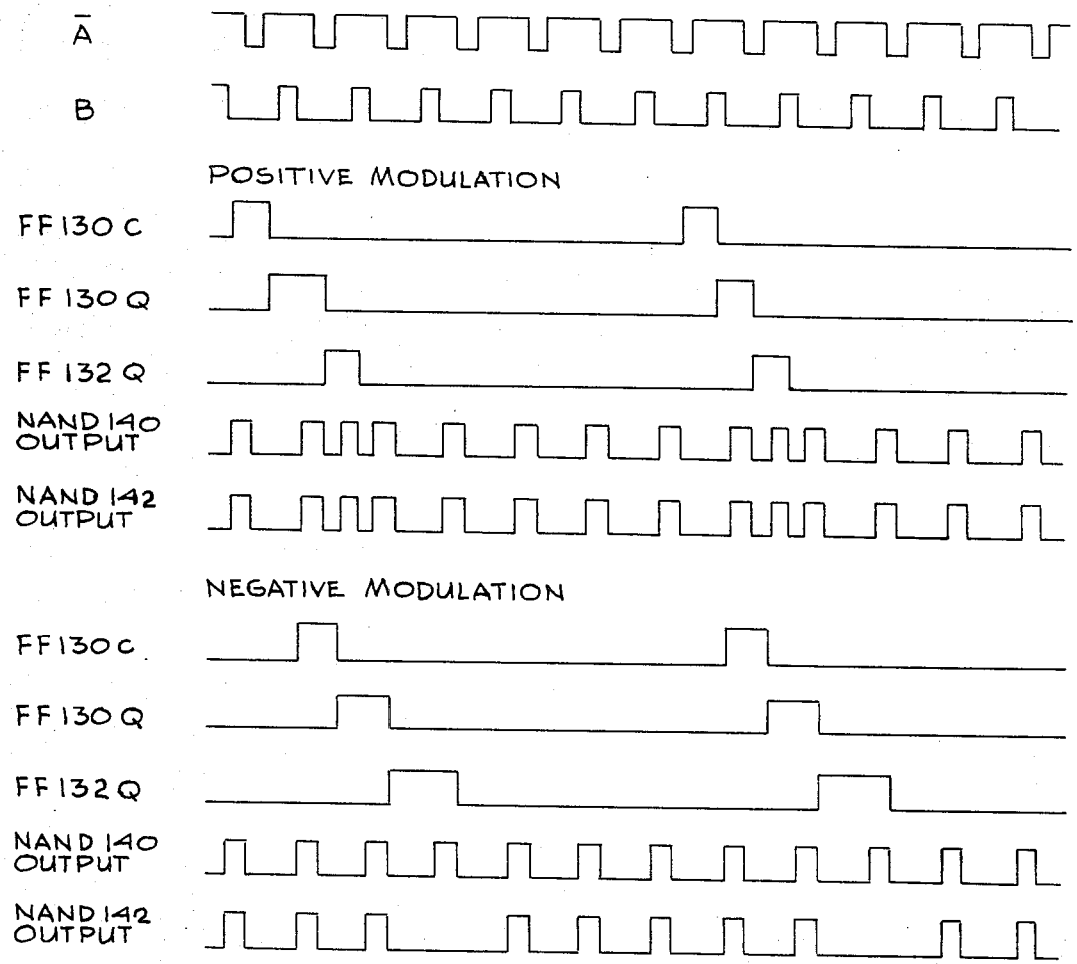
FIG. 7 is a waveform diagram illustrating the signals occurring in the circuitry of FIGS. 5 and 6.
Figure 5:
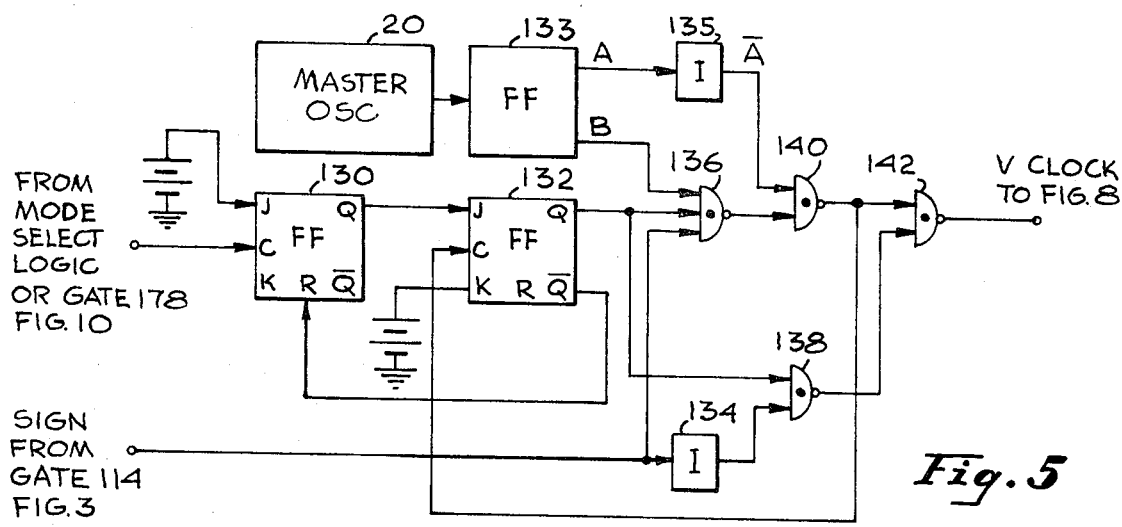
FIG. 5 is a block schematic diagram of a velocity command modulator employed with this invention.

FIG. 5 is a block schematic diagram of the velocity command modulator and FIG. 7 is a waveform diagram shown to assist in an understanding of the operation of the circuits.

Pulses which are passed by the mode select logic 40 are applied to the C or clock input of a first flip-flop 130. There is a second flip-flop 132 which has the Q output of flip-flop 130 connected to its input. Flip-flops 130 and 132 are of the well-known type which have a J, K and C input and Q and $\overline{Q}$ output. If the input is high while a C or clock pulse signal is applied to the C input on the negative going edge of the clock pulse the flip-flop is set to provide a high $\overline{Q}$ output. If the K input is high while a clock pulse is applied to the C input, then, on the negative going edge of the clock pulse the flip-flop is reset to provide a high Q output. If both J and K inputs are high, the flip-flop toggles in response to successive clock pulses. The flip-flops also have an R or reset input to which the application of a negative going pulse causes the flip-flop to be reset. There is a bias applied to the input of flip-flop 130, and a bias applied to the K input of flip-flop 132.

The master oscillator 20 (FIG. 1) drives a flip-flop 133 whose successive positive outputs are termed A and B pulses. The A pulses are applied to an inverter 135 to produce negative output pulses. These constitute the $\overline{A}$ pulses. FIG. 7 shows alternate $\overline{A}$ and B pulses.

The modulator sign signal, which is the output from NAND gate 114 in FIG. 3, is applied to an inverter 134 as one input to a three input NAND gate 136. The inverter 134 output constitutes one input to a two input NAND gate 138. Thus, for a positive sign signal, NAND gate 138 is disabled, and there is one enabling input applied to NAND gate 136.

The mode select logic 40 (FIG. 1) provides an input pulse to the C terminal of flip-flop 130 (See FIG. 7). On the negative going portion of this pulse the Q output of flip-flop 130 goes high, which signal is applied to the J input of flip-flop 132. Flip-flop 132 Q output still remains low, however, until an input is received on its C input. Thus, NAND gate 136 output is high. A NAND gate 140 receives $\overline{A}$ pulses and the output of NAND gate 136. Upon the occurrence of an $\overline{A}$ pulse NAND gate output goes high (See FIG. 7). When the $\overline{A}$ pulse rises, the output of NAND gate 140 goes negative, and since the output of the NAND gate 140 is connected to the C input of flip-flop 132, then at this time the Q output of flip-flop 132 does high (See FIG. 7).

The high Q output of flip-flop 132 enables NAND gate 136 so that a B pulse can get through it. At the same time, the $\overline{Q}$ output of flip-flop 132 which is negative going, resets the flip-flop 130. The B pulse which passes through NAND gate 136 causes a positive going pulse at the output of NAND gate 140. When this terminates then by virtue of the feedback to the C terminal of flip-flop 132, the flip-flop is reset.

A NAND gate 142 is enabled by the output of NAND gate 138 at this time. Since its other input is connected to the output of NAND gate 140 for every pulse passed by NAND gate 140, NAND gate 142 passes a pulse while enabled by NAND gate 138 (See FIG. 7).

From the foregoing description and from the waveforms shown in FIG. 7, it should be apparent that for a positive sign, a B pulse is added to the A pulse train for each command pulse. The waveforms in FIG. 7 labeled "Negative Modulation" show that an A pulse is removed from the output of NAND gate 142 when the sign of a command pulse is negative. A negative sign signal blocks NAND gate 136 from passing a B pulse in the presence of a Q output from flip-flop 132. Flip-flop 130 is driven to provide a Q output when its C input is driven, and the next $\overline{A}$ pulse occurring thereafter causes flip-flop 132 to provide a Q output which is followed by flip-flop 130 being reset. NAND gate 138 is enabled in response to the flip-flop 132 Q output and blocks NAND gate 142 with its output. Thus the $\overline{A}$ pulse arriving after flip-flop 132 provides a Q output, gets through NAND gate 140, resets flip-flop 132, but is blocked from getting through NAND gate 142. The output of NAND gate 142 is applied to the velocity command counter shown in FIG. 8.

FEEDBACK MODULATOR 60, FIG. 6

Figure 6:
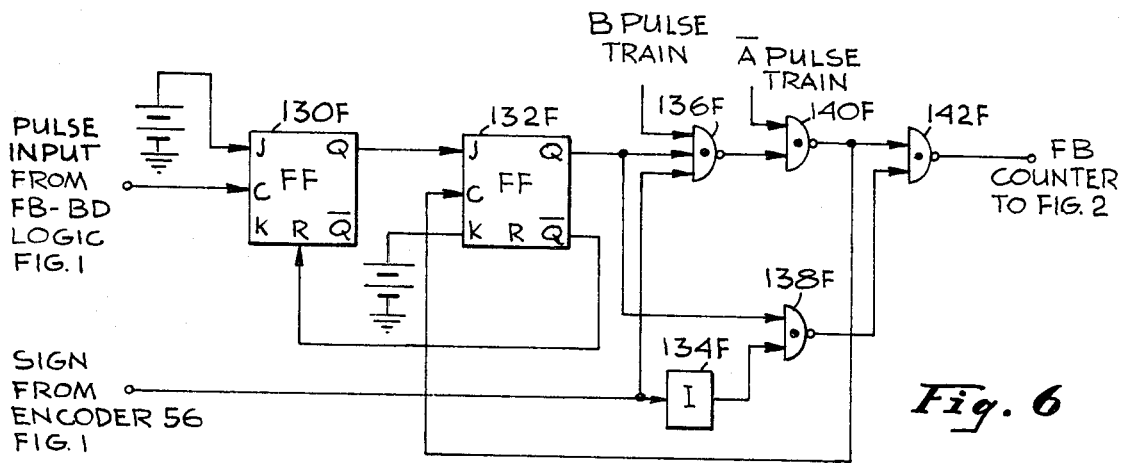
FIG. 6 is a block schematic diagram of a feedback modulator which is employed with this invention.

FIG. 6 is a block schematic diagram of the feedback modulator. This circuit is identical with the velocity command modulator, and its components have been similarly numbered except that they bear the letter "F" in addition, indicative of the fact that they are part of the feedback modulator. The $\overline{A}$ and B pulses are received from the same source as shown in FIG. 6. However, the sign signal and the command signal input to flip-flop 130F are received from the incremental encoder 56 (FIG. 1). The operation of the circuit is the same in response to its inputs as has been described in connection with FIG. 5, and thus it will not be redescribed. The output of the feedback modulator is applied to the feedback counter to advance its count.

VELOCITY COUNTER AND DEMODULATOR, FIG. 8

FIG. 8 is a block schematic diagram of the velocity command counter 46 and the demodulator 48 which are shown in FIG. 1. The velocity command counter has a count capacity which in accordance with the example selected herein is 4 × $10^3$ or 1 inch. The velocity command counter is driven by V clock pulses which are received from velocity command modulator shown in FIG. 5. The last state of the velocity command counter provides two outputs. One of these is designated as V which represents a completion of the 4 × $10^3$ count, and the other is $\overline{V}$ which is the output provided by the counter while it is in the process of counting up to the 4 × $10^3$ count. The V output is applied as one input to a two input NAND gate 210 which is flip-flop connected with a NAND gate 212. The second input to the NAND gate 212 is derived from the feedback counter. It is the $\overline{FB}/100$ output of the feedback counter.

The output of NAND gate 210 is applied as one input to NAND gate 212 and is applied as an input to NAND gate 214. The output of the NAND gate 212 besides being applied as a second input to the NAND gate 210 is also applied as an input to a NAND gate 216.

NAND gates 218 and 220 are also flip-flop connected to one another. An input to NAND gate 218 is the $\overline{V}$ output of the velocity command counter 46. An input to NAND gate 220 is an FB/100 output of the feedback counter shown in FIG. 2. The output of NAND gate 218 besides being connected as an input to NAND gate 220 is also applied as an input to a NAND gate 214. The output of NAND gate 220 besides being applied as an input to NAND gate 218 is also applied as an input to NAND gate 216. The outputs of NAND gates 214 and 216 are applied as inputs to a NAND gate 222 whose output constitutes the following error magnitude. The output of NAND gate 214 is also applied to an inverter 224 whose output is pulse width representing the requirement for positive motion. The output of inverter 226 is pulse width representing the requirement for negative motion. The outputs of the inverters 224 and 226 are applied to the interface circuitry 50 as shown in FIG. 1.

NAND gates 210 through 222 and the two inverters 224 and 226 represent the demodulator circuitry. This circuitry detects any following error between the velocity command counter and the feedback counter and provides an indication thereof to the interface circuitry. Also when the following error becomes less than a certain amount, the mode select logic is instructed in response thereto to no longer permit the passage of pulses from the feed rate generator to the velocity command modulator.

The input to the velocity command counter is the velocity clock which is the output of the velocity modulator as shown in FIG. 5. With the basic resolution of the system being 0.0005 inch, and a counter length of 4,000 for the velocity command counter, the maximum following error that can be achieved with this system is one inch. The following error is developed by the full wave demodulator shown which compares the phase outputs of the velocity counter and the 1 inch point FB/100 of the feedback counter. These outputs are then fed to the interface circuitry. The following error will comprise a signal whose duration is determined by the interval between the occurrence of the V output and the FB/100 output. This interval is constant for a specific velocity and becomes smaller after being equal to the comparator magnitude and vanishing at end point.

Assuming the velocity command counter and the feedback counter at 1 inch count are out of phase, the $\overline{V}$ and $\overline{FB}/100$ signals are present most of the time. During this time the output of NAND gate 220 is high and the output of NAND gate 218 is low. The output of NAND gate 210 is high and the output of NAND gate 212 is low. Thus, the output of NAND gate 214 is high and the output of NAND gate 216 is high. The output of NAND gate 222 is therefore low, and the outputs of inverters 224 and 226 respectively, are high.

Upon the occurrence of V output from the velocity command counter while the $\overline{FB}/100$ signal is high, NAND gate 218 output is high and NAND gate 220 output is low. NAND gate 210 output swings from high to low and NAND gate 212 output remains high. NAND gate 214 output remains high and NAND gate 216 output goes low. Thus, the beginning of the following error is indicated by the fact that the output of NAND gate 222 goes high. It will remain high until an FB/100 signal occurs. Should an FB/100 signal arrive while the $\overline{V}$ output is present, the occurrence of the following error would still be indicated by the output of NAND gate 222 going from low to high.

Figure 9A:
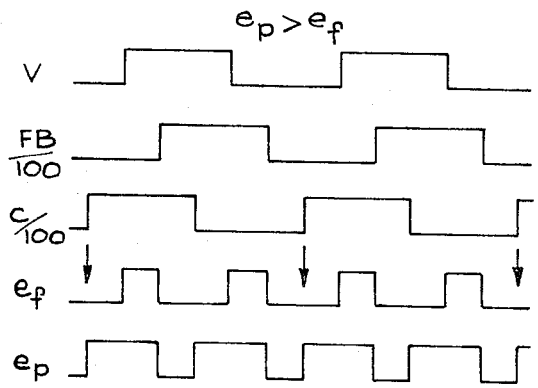
FIGS. 9A and 9B are waveshape diagrams, shown to assist in an understanding of the operation of FIGS. 8 and 10.
Figure 9B:
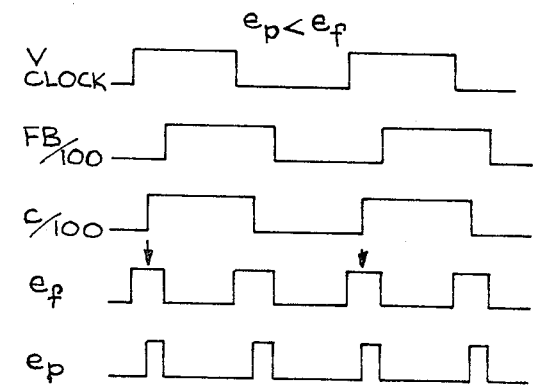

Referring now to FIGS. 9A and 9B, there may be seen waveforms which should assist in an understanding of the operation of the circuits. Both sets of waveforms represent the situation where the command counter leads. The following error signal is the waveform $e_f$. FIG. 9A represents $e_p > e_f$, FIG. 9B represents $e_p < e_f$. The $e_f$ signal (output of NAND gate 222) is initiated upon the occurrence of the V output of the counter 46. Upon the occurrence of FB/100 signal $e_f$ terminates. The C/100 signal initiates the $e_p$ signal.

As the C/100 signal commences closer and closer to the beginning of the FB/100 signal, $e_p$ gets narrower and narrower, (See FIG. 9B). The results obtained when $e_p$ equals or is less than $e_f$ will be described below.

As the occurrence of V and FB/100 get closer and closer $e_f$ gets narrower. Considering now the situation when the V and $\overline{FB}/100$ outputs occur together, since $\overline{FB}/100$ is now low, the output of NAND gate 212 will go high and the output of NAND gate 210 will go low. The output of NAND gate 218 will go high and the output of NAND gate 220 will go low. As a result, NAND gate 214 will have a high output as will NAND gate 216. Thus, the output of NAND gate 222 indicative of the following error remains low before, after, and during each inch-count by both feedback and velocity command counters.

MODE SELECT LOGIC 40 AND IN POSITION DETECTION LOGIC

Figure 10:
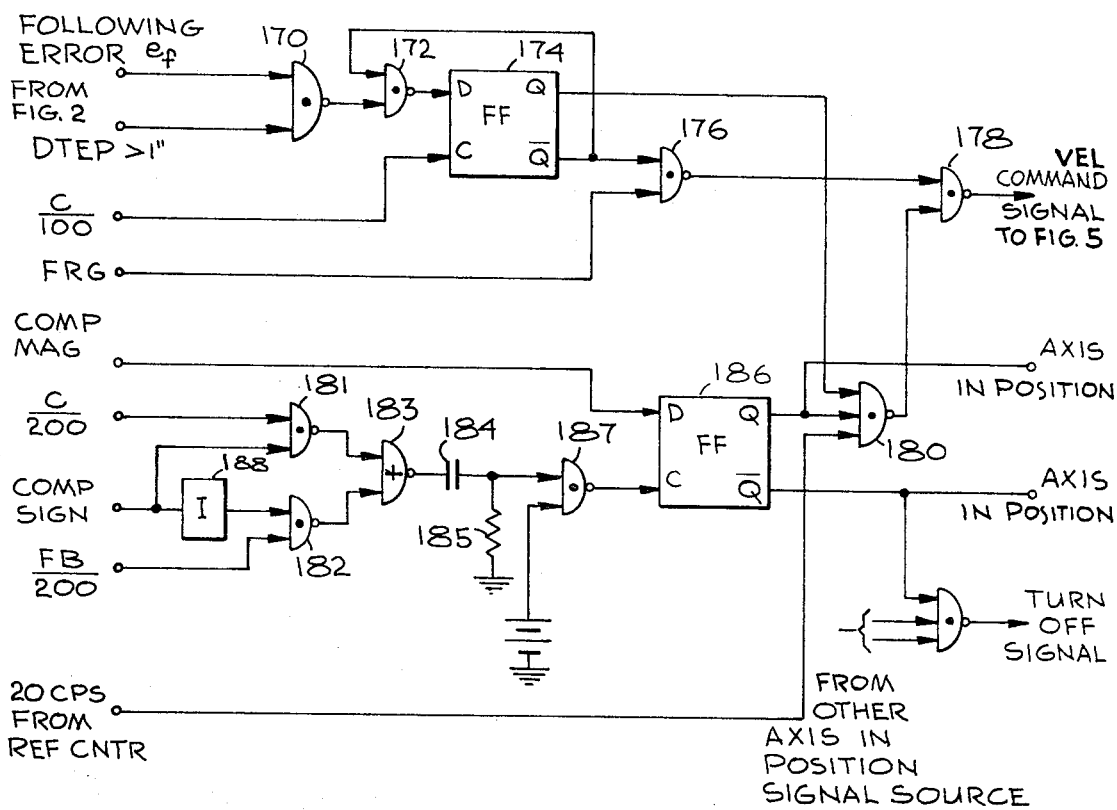
FIG. 10 is a block schematic diagram of mode selection logic and end point detection circuits which are employed herein.

FIG. 10 is a detailed block schematic diagram of the mode select logic 40 together with associated structure which indicates when the machine tool table has reached its commanded position. The mode select logic determines in which of three modes the machine tool table is to operate. These are the normal positioning mode in which the feed rate generator supplies the control pulses, the deceleration mode, and the in position integration mode.

The following error signal $e_f$ and the distance to the end point signal is greater than 1 inch (DTEP>1 inch) are applied to NAND gate 170 whose output is applied to a NAND gate 172. The other input to NAND gate 172 is the $\overline{Q}$ output of a flip-flop 174. The output of NAND gate 172 is applied to the D input of flip-flop 174. The C/100 signal is applied to the clock or C input of flip-flop 174. Flip-flop 174 is of the well-known type which is driven to its set state when a positive or high signal is applied to its D input together with a positive going signal being applied to its C input, but will be reset if the D input is low and a positive going signal is applied to its C input.

The $\overline{Q}$ output of flip-flop 174 is applied to a NAND gate 176. The second required input to NAND gate 176 is the output of the feed rate generator 42 shown in FIG. 1. The output of the NAND gate 176 is applied to a NAND gate 178 whose other input is the output of a NAND gate 180. The output of NAND gate 178 is the velocity command signal which is applied to the velocity command modulator, and more specifically, to the clock input of flip-flop 130 shown in FIG. 5.

The C/200 count output of the command counter together with the comparator sign output is applied to an AND gate 181. The FB/200 count of the feedback counter is applied to an AND gate 182 together with the output of an inverter 188 whose input is the sign signal output of the comparator 36. The outputs of the AND gates 181 and 182 are applied to a NOR gate 183. NOR gate 183 comprises an OR gate followed by an inverter. It provides a high output when both of its inputs are low, or a low output when both of its inputs are high, or a low output when either of its inputs is high. The output of NOR gate 183 is applied through a series capacitor 184 and resistor 185 to a NAND gate 187 that has its other input biased. The circuit including the series capacitor 184, resistor 185, and biased NAND gate 187 operates to provide an inverted pulse output in response to a positive transition applied to the capacitor. The output of NAND gate 187 is applied to the C terminal of flip-flop 186. The comparator 36 magnitude output is applied to the D input of flip-flop 186. Flip-flop 186 operates in the same manner as flip-flop 174. Flip-flop 186 has its Q output applied as one input to NAND gate 180. The Q output of flip-flop 174 is also applied to NAND gate 180. A third input NAND gate 180 is a 20 cycles per second signal from the reference counter.

In order to better understand the operation of the mode select logic circuitry reference is again made to FIG. 9A. When the DTEP signal $e_p$ exceeds $e_f$ as shown in FIG. 9A the C/100 signal arrives before the $e_f$ signal. Therefore, when the positive going portion of C/100 is applied to the C terminal of flip-flop 174 the D terminal is still low since NAND gate output is high and is inverted to low by NAND gate 172. Thus, flip-flop 174 is reset and its $\overline{Q}$ output is high. This enables feed rate generator pulses to pass through NAND gate 176. NAND gate 178 which receives an enabling input from NAND gate 180 can pass the feed rate generator pulses as velocity command signals to the velocity modulator shown in FIG. 5.

As shown in FIG. 9B, when the $e_f$ signal exceeds the $e_p$ signal both $e_f$ and $e_p$ are present when the C/100 signal arrives. This time NAND gate 172 applies a high input to flip-flop 174D input when C/100 is applied to the C input of flip-flop 174 whereby it is driven to its set state. This blocks NAND gate 172 and also blocks NAND gate 176 since the $\overline{Q}$ output is now low. NAND gate 180 is now enabled by flip-flop 174 which can now pass 20 cycle pulses received through NAND gate 180 until the machine tool reaches the desired position. The machine tool can coast to the desired position assisted by the 20 cycle pulses.

The "in position" detection function is provided by flip-flop 186 and its associated circuits. The comparator 36 provides a signal $e_p$ indicative of the actual distance to the end point when within 1 inch of the end point. Therefore, an "in position" signal can be generated by comparing the comparator magnitude output with a pulse. A pulse is required because of the difference in propagation delays of the command and feedback counters. Since the comparator magnitude output is the phase difference between these two counters, a very narrow pulse (less than ½ microsecond) could occur on the comparator magnitude line, even when the machine tool is in position.

The required pulse is generated when the sign of the motion is positive in response to a C/200 signal and when the sign of the motion is negative in response to a FB/200 signal. A positive comparator sign signal opens gate 181 so that a C/200 signal can pass through AND gate 181. This passes through OR gate 183. Capacitor 184, resistor 185, and NAND gate 187 converts this to a ½ microsecond pulse. This is applied as a negative going pulse to the C terminal of flip-flop 186. The comparator magnitude pulse is applied as a positive going pulse to the D input of flip-flop 186. Both pulses start together but do not finish together.

When the positive going comparator magnitude pulse width exceeds ½ microsecond, the clock pulse terminates and rises before the termination of this pulse, i.e., while the output is high, and thus the flip-flop 174 remains set. When the comparator magnitude pulse width is less than the ½ microsecond clock pulse the ½ microsecond pulse applied to the C input goes positive when the D input is low, which drives the flip-flop 174 to its reset state. The $\bar{Q}$ output is used as an "in position" signal. NAND gate 180 is blocked and no further cycle pulses are applied to NAND gate 178.

From the foregoing description it should be appreciated that a novel and useful machine tool control system has been described which for each axis of motion compares the present position of a machine tool with a desired position and produces comparator signals which are compared to "following error" signals for the purpose of enabling the feed rate generator output to drive a velocity command counter. The output of the velocity command counter which has a 1 inch capacity is compared with the feedback counter at the 1 inch count position to produce both a following error and signals which are then used to drive the machine tool table to its intended position. A transducer generates pulses responsive to machine tool table motion which are used to change the indicated machine tool table position toward the intended position. When the intended position is reached, a signal indicative of this is provided and the table motion along the particular axis is terminated.

The various logic circuits, such as NAND gates and flip-flop circuits have been indicated by block schematic representations and not described in detail because they are so well-known in the art and are also commercially purchasable. For example, all of the logic circuits described herein in an embodiment of the invention which was built and operated successfully were purchased from the Texas Instruments Corporation of Dallas, Texas, and were designated as part of their Series SN 7400N line.

While the foregoing description recites that the machine tool table is moved by the control system, it is obvious to those skilled in the art that the present control system may also be used for moving a tool or tool holder in those machines where the table is maintained stationary and the tool is moved. Therefore, wherever the specification and claims recite "machine tool position" it is intended to means the position of the machine tool table relative to the machine tool and by "machine tool motion" is intended to mean the relative motion between the tool and the table.

The embodiments of the invention in which an exclusive property or privilege is claimed are defined as follows:

1. A system for directing a numerically controlled machine tool to move from a first position to a second position in response to a numerical word representing said second position, and wherein each position along each coordinate axis is specified by a numerical word, said system comprising, for each axis:

feedback counter means for providing an output representative of the first position of said machine tool;
    command counter means;
    means responsive to a numerical word representative of a second position for placing said following command counter into a count state representative of said second position;
    means for comparing the relative phase relationship between predetermined multiple count outputs of said command and feedback counters to produce a difference signal indicative of a phase difference in said outputs;
    means responsive to the difference signal output of said means for comparing for enabling motion of said machine tool in the presence of said difference signal;
    means for changing the count of said command counter at a first rate; and
    means for changing the count of said feedback counter at a second rate determined by said first rate and the extent of machine tool motion.

2. A system for directing a numerically controlled machine tool to move from a first position to a second position in response to a numerical word representing said second position, and wherein each position along each coordinate axis is specified by a numerical word, said system comprising, for each axis:

feedback counter means for providing an output representative of the first position of said machine tool;
    command counter means;
    means responsive to a numerical word representative of a second postion for placing said command counter into a count state representative of said second position;
    means for comparing the relative phase relationship between predetermined multiple count outputs of said command and feedback counters to produce difference signals indicative of a phase difference in said outputs;
    a source of machine tool motion command signals;
    means for moving said machine tool responsive to said machine tool motion command signals;
    means responsive to said difference signals for enabling said machine tool motion command signals to be applied from said source to said means for moving said machine tool;
    means for changing the count of said command counter at a first rate;
    means for changing the count of said feedback counter at a second rate determined by said first rate and the extent of machine tool motion; and
    means for terminating the application of said motion command signals to said means for moving said machine tool responsive to said difference signals attaining a predetermined minimal value.

3. A system for directing a numerically controlled machine tool to move from a first position to a second position in response to a numerical word representing said second position, and wherein each position along each coordinate axis is specified by a numerical word, said system comprising, for each axis;

feedback counter means for providing an output representative of the first position of said machine tool;
    command counter means;
    means responsive to a numerical word representative of a second position for placing said command counter into a count state representative of said second position;
    means for comparing the relative phase relationship between predetermined multiple count outputs of said command and feedback counters to produce difference signals indicative of a phase difference in said outputs;
    a source of machine tool motion command signals;
    means for moving said machine tool responsive to said machine tool motion command signals;
    means responsive to said difference signals for enabling said machine tool motion command signals to be applied from said source to said means for moving said machine tool;
    means for generating a motion indicating signal responsive to each increment of motion of said machine tool;
    a source of oscillations;
    means for applying oscillations from said source to said command counter to alter its count responsive thereto;
    means modulating said oscillations with said motion indicating signals;
    means for applying said modulated oscillations to said feedback counter to alter its count responsive thereto; and
    means for terminating the application of said motion command signals to said means for moving said machine tool responsive to said difference signal attaining a predetermined minimal value.

4. A system as recited in claim 3 wherein said means for comparing predetermined multiple count outputs of said feedback counter and command counter includes means for producing a first difference signal when the phase difference between said command counter and said feedback counter exceeds a predetermined value and a second difference signal when the phase difference between said command counter and said feedback counter is less than said second value,
    said source of machine tool motion command signals includes means for producing motion command signals at a first and a second frequency, said second frequency being lower than said first frequency, and said means responsive to said difference signal for enabling machine tool command signals to be applied from said source to said means for moving said machine tool includes means for applying motion command signals at said first frequency responsive to said first difference signal and for applying motion command signals at said second frequency responsive to said second difference signal.

5. A system as recited in claim 3 wherein said means for comparing the relative phase relationship between predetermined multiple count outputs of said command and feedback counters to produce a difference signal includes:
 means for generating a first pulse signal having a width determined by the interval between the two last counts of said command and feedback counters;
 means for generating a second pulse signal simultaneously with the generation of said first pulse signal and having a predetermined fixed width;
 means for comparing the width of said first and said second pulses for producing a first gate enabling signal when said first pulse width is less than said second pulse width;
 means for generating third pulse signals having a pulse width determined by the interval between two identical count outputs of said respective feedback and command counters which occur at predetermined locations near the beginning of said respective counters; and
 first gate means to which said first gate enabling signals and said third pulse signals are applied for producing as its output said difference signal comprising said third pulse train.

6. A system as recited in claim 5 wherein said means for comparing the outputs of said command and feedback counters to produce a difference signal includes:
 a second gate means;
 means for generating a second gate enabling signal during intervals elapsing between successive first gate enabling signals; and
 third gate means to which said second gate enabling signals and said third pulse signals are applied for producing a train of signals, each representing the distance of said machine tool to the desired end point.

7. A system as recited in claim 3 wherein said source of motion command signals includes:
 means for generating a first train of pulses having a feed rate frequency;
 first gate means;
 means for generating second pulse signals each having a width representative of the lag between the actual position of said machine tool and the commanded position occurring at the end of a predetermined distance;
 means for generating third pulse signals each having a width representative of the actual distance of said machine tool from said desired position;
 means for applying said first train of pulses to said first gate means; and
 means to which said second and third pulses are applied for enabling said first gate means to pass said first train of pulses until said third pulse signals are narrower than said second pulse signals.

8. A system as recited in claim 7 wherein said means for generating second pulse signals includes:
 following error counter means having a count capacity representative of a count required for said machine tool table to move said predetermined distance;
 means for driving said following error counter responsive to said first train of pulses; and
 means for comparing the output of the last count of said following error counter and the output of said feedback counter at a count location therein similar to the last count of said following error counter for generating second pulse signals responsive thereto.

9. Apparatus as recited in claim 8 wherein said means for driving said following error counter responsive to said first train of pulses includes:

means for modulating said second train of pulses on oscillations from said source of oscillations, to produce a resultant pulse train; and
 means for driving said following error counter means with said resultant pulse train.

10. A system for directing a multi-coordinate axis numerically controlled machine tool to move from a first position to a second position in response to a numerical word representing said second position, and wherein each position along each coordinate axis is specified by a numerical word, said system comprising for each axis;
 feedback counter means for providing an output representative of the first position of said machine tool;
 command counter means;
 means responsive to a numerical word representative of a second position for placing said command counter into a count state representative of said second position;
 means for generating a feed rate pulse train;
 means responsive to said feed rate pulse train and count output from said feedback counter for generating following error pulse signals each representative of the lag between the actual machine tool position and a commanded machine tool position occurring at the end of a predetermined commanded distance of travel;
 means responsive to the relative phase relationship between said command and feedback counter outputs for generating difference pulse signals each representing the actual distance of said machine tool from its second position;
 first gate means to which said feed rate pulse train is applied;
 means to which said following error and difference pulse signals are applied for enabling said first gate means to pass said feed rate pulse train to said means for generating following error pulse signals until each said difference pulse signal has a smaller width than each said following error pulse signal;
 means for moving said machine tool responsive to said following error pulse signals;
 means for generating a motion indicating signal responsive to each increment of motion of said machine tool;
 a source of oscillations;
 means for driving said command counter responsive to said oscillations;
 means for modulating said motion indicating signals on said oscillations; and
 means for driving said feedback counter with said modulated oscillations.

11. A system as recited in claim 10 wherein said means responsive to said feed rate pulse train and an output from said feedback counter for generating following error pulse signals each representative of the lag between the actual machine tool position and a commanded machine tool position includes a second means coupled to the output of said first gate means for modulating said feed rate pulse train on oscillations from said source of oscillations;
 a following error counter having a count capacity equal to the count output of said feedback counter;
 means for applying the output of said second means for modulating to said following error counter to drive it through its successive count conditions; and
 means responsive to the full count output of said following error counter and said count output of said feedback counter for generating a following error pulse having a width equal to the interval occurring therebetween.

12. A system as recited in claim 10 wherein said means responsive to said command and feedback counter outputs for generating difference pulse signals each representing the actual distance of said machine tool from its second position includes means to which said identical count outputs of said command and feedback counters are applied for generating a pulse having a width determined by the interval occurring between said identical count outputs.

13. A system as recited in claim 10 wherein said means to which said following error and difference pulse signals are applied for enabling said first gate means to pass said feed rate pulses to said means for generating following error pulse signals includes;

flip-flop means having a first and second stable state and producing a first gate enabling output when in its first stable state;

a second gate means to which said following error and difference pulse signals are applied for producing a first output for driving said flip-flop to its first stable state when each said difference pulse signal has a larger width than each said following error pulse signal and a second output for driving said flip-flop to its second stable state when each said difference pulse signal has a smaller width than each said error pulse signal;

means for applying the output of said second gate means to said flip-flop means; and means for applying the output of said flip-flop means when in its first stable state to said first gate means.

14. A system as recited in claim 10 wherein there is included:

means for deriving a low frequency pulse train from said source of oscillations having a frequency that is low compared to the frequency of said feed rate pulse signals;

a third gate means to which said low frequency pulse train is applied;

means for applying said low frequency pulse train to said third gate means;

means for enabling said third gate responsive to said difference pulse signals having a width smaller than a predetermined amount;

a fourth gate means;

means for applying the output of said first gate means to said fourth gate means;

means for applying the output of said third gate means to said fourth gate means; and means coupling the output of said fourth gate means to said means for generating following error pulse signals.

15. A system as recited in claim 14 wherein said means for enabling said third gate means includes a second flip-flop means having a first and second stable state and providing a third gate enabling output when in its first stable state;

a fifth gate means;

means for recurrently generating a timing pulse having a predetermined pulse width;

means for applying said timing pulse and said difference pulse signals to said fifth gate means to enable said fifth gate means to produce an output to drive said second flip-flop means to its first stable state when each of said timing pulses is smaller in duration than each of said difference pulses, and to drive said second flip-flop means to its second stable state when each of said timing pulses is larger in duration than each of said difference pulses; and means for applying said fifth gate means output to the input of said second flip-flop means.

16. A system for directing a numerically controlled machine tool to move from a first position to a second position in response to a numerical word representing said second position, and wherein each position along each coordinate axis is specified by a numerical word, said system comprising for each axis:

feedback counter means for providing an output representative of the first position of said machine tool;

command counter means;

means responsive to a numerical word representative of a second position for placing said command counter into a count state representative of said second position;

means for generating a feed rate pulse train;

a following error counter having a predetermined count capacity;

means responsive to the full count output of said following error counter and the count output of said feedback counter at a count equivalent to said full count output for generating following error pulses each having a width determined by the difference in the interval occurring between said counts;

means for moving said machine tool responsive to said following error pulses;

means for generating a motion indicating signal responsive to each increment of motion of said machine tool;

a source of oscillations;

means for driving said command counter responsive to said oscillations;

means for modulating said motion indicating signals on said oscillations;

means for driving said feedback counter responsive to said oscillations modulated by said motion indicating signals;

means for modulating said oscillations with said feed rate pulse train;

means for driving said following error counter with said oscillations modulated by said feed rate pulse train;

means responsive to multiple outputs of said command and feedback counter outputs for generating difference pulse signals, each representing the actual distance of said machine tool from the second position; and means responsive to said difference pulse signals being smaller than a predetermined width for terminating further application of said oscillations modulated by said feed rate pulse train to said following error counter to thereby terminate further motion of said machine tool.

17. A system for directing a multiaxial numerically controlled machine tool table to move from its present or first location to a second location, wherein each location of the machine tool table along each coordinate axis may be specified by a numerical word comprising for each axis:

feedback counter means;

command counter means;

a source of numerical words each representative of a desired location for said machine tool;

means for reading out one of the numerical words of said source;

means responsive to the numerical words read out for altering the count in said command counter to be representative of a desired position for said machine tool table;

a reference source of oscillation;

means for applying the output of said reference source of oscillation to said command counter to advance its count responsive thereto;

means responsive to oscillations from said source and to said machine tool table motion for altering the count in said feedback counter means for always maintaining the count of said feedback counter means representative of the location of said machine tool table;

means for comparing the relative phase relationship between predetermined multiple count outputs of said command and feedback counters to produce a first difference signal when the difference between said count outputs exceeds a predetermined minimum value and a second difference signal representative of the actual interval between said count outputs when the difference between said count outputs is less than said minimum value;

means responsive to said first difference signal for moving said machine tool table towards said second position at first velocity and responsive to said second difference signal for moving said machine tool table toward said second position at a second velocity lower than said first velocity;

means responsive to said second difference signal attaining a predetermined minimum value for terminating the motion of said machine tool table; and means responsive to the termination of the motion of said machine tool table along all said axes for actuating said means for reading out to read out another of said numerical words from said source.

* * * * *

PO-1050
(5/69)

UNITED STATES PATENT OFFICE
CERTIFICATE OF CORRECTION

Patent No. 3,668,500     Dated June 6, 1972

Inventor(s) Marion Kosem

It is certified that error appears in the above-identified patent and that said Letters Patent are hereby corrected as shown below:

Column 6, Line 10    "occurs" should read --counters--

Column 6, Line 25    Delete "comma (,)" after --occurs--

Column 6, Line 47    "(DTETP)" should read --(DTEP)--

Column 9, Line 2     "Q" should read --$\overline{Q}$--

Column 9, Line 32    "does" should read --goes--

Column 10, Line 17   "V" should read --$\overline{V}$--

Column 10, Line 59   "inch" should read --inches--

Column 13, Line 40   "means" should read --mean--

Signed and sealed this 21st day of November 1972.

(SEAL)
Attest:

EDWARD M. FLETCHER, JR.             ROBERT GOTTSCHALK
Attesting Officer                   Commissioner of Patents